United States Patent

[11] 3,603,062

| [72] | Inventors | Charles H. Robbins<br>Saratoga;<br>George W. Fitzsimmons, San Jose; Robert L. Hughes, Saratoga; Robert L. Moen, San Jose, all of, Calif. |
|---|---|---|
| [21] | Appl. No. | 777,611 |
| [22] | Filed | Nov. 21, 1968 |
| [45] | Patented | Sept. 7, 1971 |
| [73] | Assignee | General Electric Company |

[54] GAS-LIQUID SEPARATOR
10 Claims, 4 Drawing Figs.

[52] U.S. Cl. .................................................. 55/348,
 55/396, 55/423, 55/457, 55/466, 122/34
[51] Int. Cl. ............................................... B01d 45/12
[50] Field of Search ............................................ 122/34,
 488, 491; 55/392–399, 447–466, 423, 348

[56] References Cited
UNITED STATES PATENTS

| 3,009,539 | 11/1961 | Papp | 55/452 |
|---|---|---|---|
| 3,216,182 | 11/1965 | Cochran et al. | 55/448 X |
| 3,329,130 | 7/1967 | Cochran | 55/457 X |
| 3,345,046 | 10/1967 | Versluys et al. | 55/394 X |

Primary Examiner—Kenneth W. Sprague
Attorneys—Ivor J. James, Jr., Samuel E. Turner, John R. Duncan, Frank L. Neuhauser, Oscar B. Waddell and Melvin M. Goldenberg ABSTRACT: A gas-liquid separating arrangement of high-capacity per unit size including a centrifugal separator for creating a gas vortex surrounded by a liquid vortex having a first discharge passage for receiving separated liquid and a second discharge passage for receiving and separating the gas and liquid of the boundary layer between the gas and liquid vortices and including a centrifugal preliminary dryer for receiving the gas vortex from the separator and for removing additional liquid.

INVENTORS:
CHARLES H. ROBBINS
GEORGE W. FITZSIMMONS
ROBERT L. HUGHES
ROBERT H. MOEN

BY: Samuel E. Turner
ATTORNEY

PATENTED SEP 7 1971 3,603,062

GAS-LIQUID SEPARATOR

DISCLOSURE

Gas-liquid or steam-water separators adaptable for use in the pressure vessel of a nuclear reactor steam generator have been described by J. T. Cochran et al. in U.S. Pat. No. 3,216,182 and by J. T. Cochran in U.S. Pat. No. 3,329,130.

Improvements in nuclear reactor steam generators have resulted in increased power output with higher mixture and steam flow rates and higher steam quality (weight percent of steam in the mixture) at the separator inlets.

It is an object of the present invention to provide an improved gas-liquid separator which will accommodate higher inlet qualities and with increased capacity per unit size without increases in liquid carryover or gas carryunder.

It is also an object of the invention to simplify the construction and decrease the cost of gas-liquid separating units.

These and other objects of the invention are achieved by providing separating units each including a separator of the centrifugal type for receiving a gas-liquid mixture and for creasing a gas vortex surrounded by a liquid vortex. The separator includes a primary discharge passage for receiving liquid from the liquid vortex and having simplified means for arresting the rotary motion of the separated liquid and a secondary discharge passage having simplified and improved means for separating the gas and liquid from the boundary layer between the gas and liquid vortices in the separator. Each separating unit further includes a preliminary dryer, also of the centrifugal type, mounted in a gas-receiving position in relation to the separator. A feature of this arrangement is that the outside diameter of the preliminary dryer is substantially less than the outside diameter of the separator. This provides a decrease in the velocity of the gas rising among the separating units from the surface of the liquid pool and from the secondary discharge passages of the separators whereby less liquid is entrained in this gas.

These and other aspects of the invention are more fully described hereinafter with reference to the accompanying drawing wherein.

Figure 1:
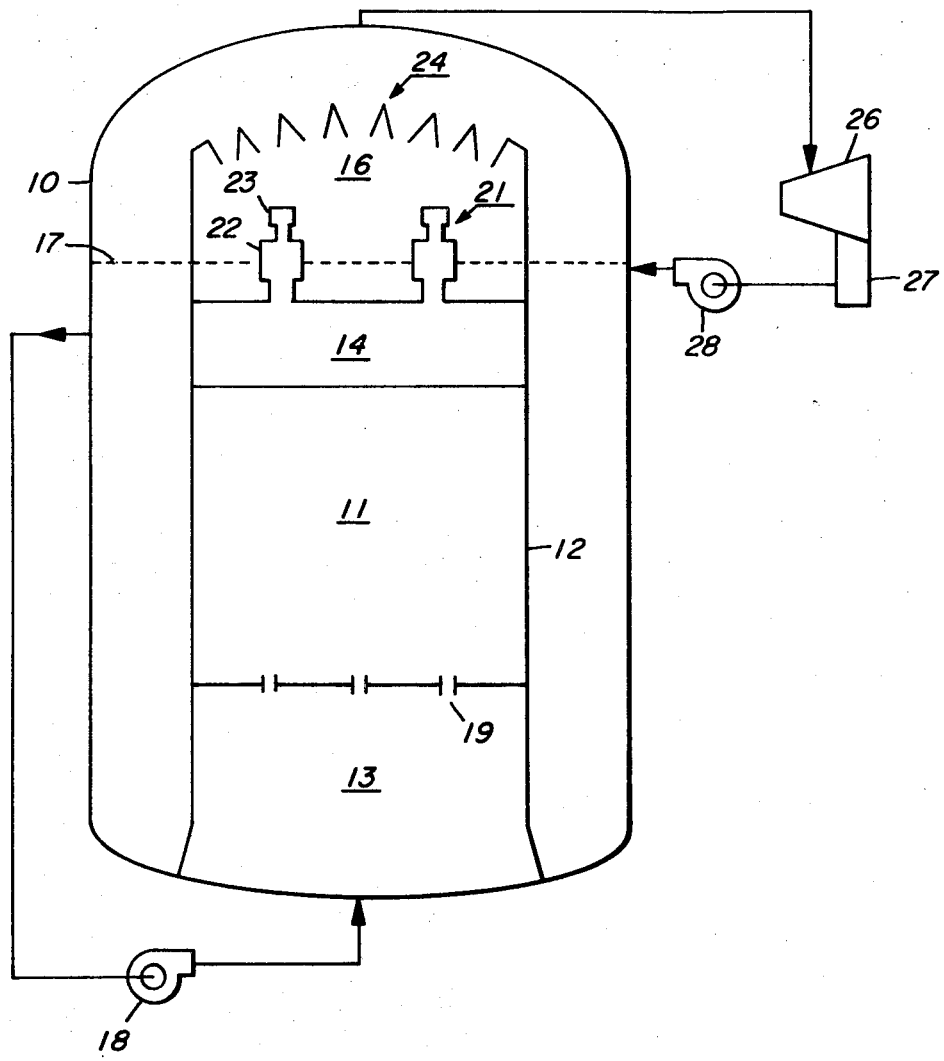
FIG. 1 is a schematic illustration of a boiling water nuclear reactor system employing the gas-liquid separating units of the present invention.

Shown schematically in FIG. 1 is an example of a nuclear reactor steam generator system of the boiling water type. The reactor system includes a pressure vessel 10 containing a nuclear fuel core 11. The core 11 is surrounded by a shroud 12 which forms a water inlet plenum 13 beneath the core, a steam-water mixture chamber 14 above the core and a steam chamber 16 above the water level indicated by a dashed line 17.

Water under pressure is supplied to the inlet plenum 13 by, for example, a circulation pump 18 by which the water is forced through a plurality of orifices 19 upward past the nuclear fuel of the core 11 whereby a portion of the water is converted into steam. The resulting steam-water mixture in chamber 14 flows through a plurality of gas-liquid separating units 21. Each of the separating units 21 comprises, in accordance with the invention, a separator 22 and a preliminary dryer 23. These units are adapted to discharge the steam into the chamber 16 and to return the water to the pool of water in the pressure vessel. The steam passes from chamber 16 through a dryer arrangement 24, which extracts residual moisture, and is taken from the pressure vessel to a utilization device such as a steam turbine 26. The turbine exhaust is condensed in a condenser 27 and returned to the pressure vessel by a pump 28.

Figure 2:
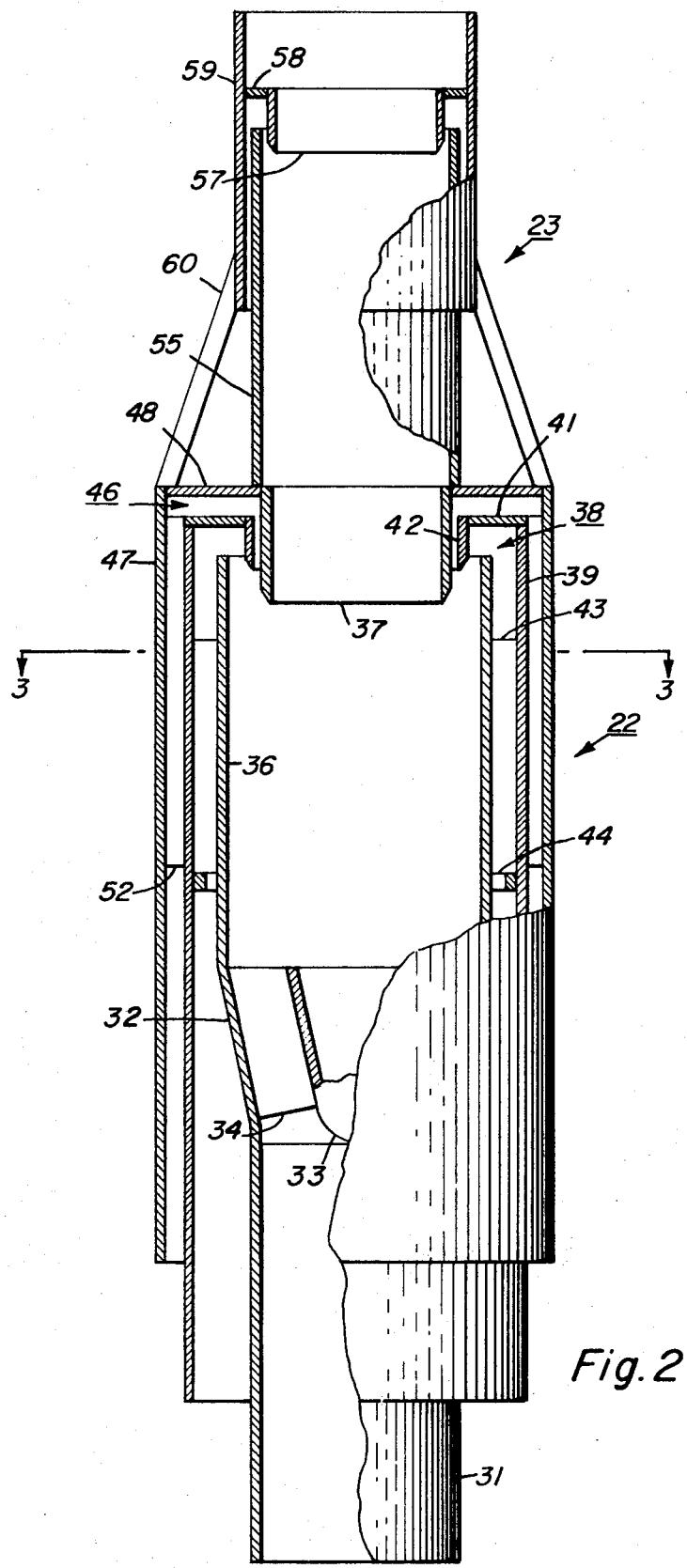
FIG. 2 is an elevation or longitudinal view, partly in cross section, of the separating unit of the invention.
Figure 3:
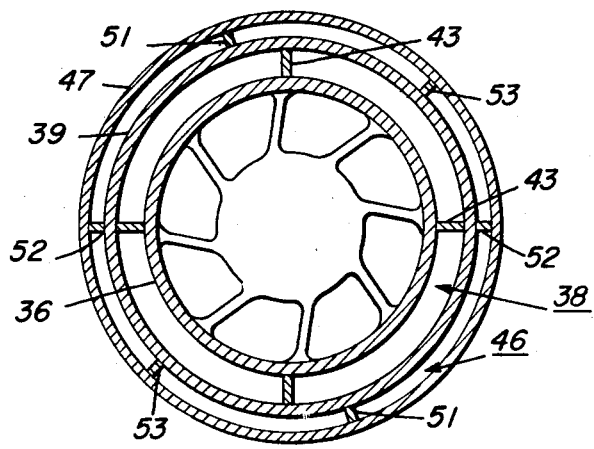
FIG. 3 is a transverse cross section view taken on line 3—3 of FIG. 2.
Figure 4:
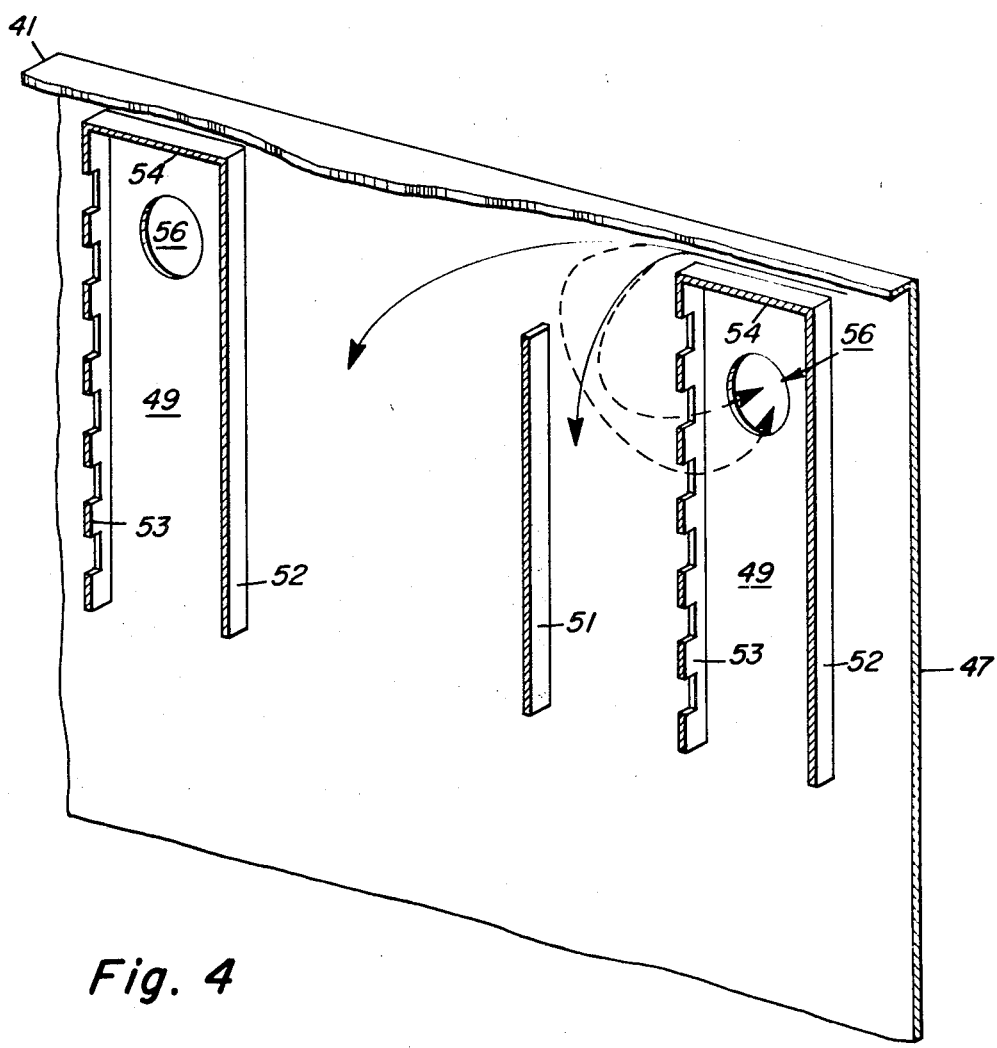
FIG. 4 is an opened and flattened perspective view of the secondary discharge passage of the separator of FIG. 2 illustrating the gas-liquid separating arrangement of the secondary discharge passage.

The gas-liquid separating unit 21 in accordance with the present invention is illustrated in FIGS. 2, 3 and 4, the lower portion forming the separator 22 and the upper portion forming the preliminary dryer 23. The steam-water mixture (from mixture chamber 14, FIG. 1) enters a standpipe 31 and is conducted thereby to a vortex generator 32. The vortex generator 32 contains vortex generating means such as a central hub 33 surrounded by a plurality of curved vanes 34 (as shown in greater detail in the above-referenced U.S. Pat. No. 3,216,182). The vortex generator thus imparts a rotary motion to the steam-water mixture as it flows upward into a separator vortex tube 36. The resulting centrifugal force creates a separation of the steam and water into an inner steam vortex surrounded by a water vortex which flows along the inner wall of vortex tube 36.

Within the separator vortex tube 36 the separation of the steam and water is quite complete and, ideally, the steam flows upward into a preliminary dryer inlet tube 37 while most of the water flows along the inner wall and over the top end of the separator vortex tube 36. In practice the water does not simply flow smoothly through the passage between the separator vortex tube 36 and preliminary dryer inlet tube 37 for several reasons including the fact that the boundary between the steam and water vortex varies with varying operating conditions. Thus the problem is to maintain the separation of the steam and water over the ranges of input qualities and mixture flow rates that the separating unit is required to accommodate.

The separator 22 is therefore provided with two discharge passages or channels. A first or primary discharge channel 38 is formed by a coaxially disposed primary removal tube or skirt 39, an annular cover 41 and a tubular pickoff ring 42. Thus a substantial portion of the water vortex flows between the upper edge of vortex tube 36 and the pickoff ring 42 and is turned downward into the primary discharge channel 38 by the cover 41. To arrest the rotary motion of the water, a plurality of longitudinally or vertically positioned baffles 43 (FIGS. 2 and 3) are provided in the primary discharge channel 38. The channel 38 is open at the bottom end to return the water to the pool. Also provided in the primary discharge channel 38 is an annular restriction ring 44 which reduces the flow cross section area of the primary discharge passage. This restriction aids in maintaining a minimum thickness of the water vortex in the separator vortex tube 36.

A secondary discharge channel 46 of the separator 22 is formed around the primary removal tube 39 by an outer tube or skirt 47, a separator top cover 48 and the lower end of the preliminary dryer inlet tube 37. The secondary discharge channel is designed to collect the steam-water mixture from the boundary between the steam and water vortices. This boundary layer mixture flows upward between the pickoff ring 42 and the preliminary dryer inlet tube 37 and laterally outward between the covers 41 and 48.

The boundary layer mixture received by the secondary discharge channel 46 contains a relatively large quantity of steam by volume. To reduce steam carryunder it is desirable to effect a separation of this steam and water and to discharge the steam into the steam chamber 16 (FIG. 1) while discharging the water out of the open bottom end of the secondary discharge channel. In separator arrangements of the prior art this purpose is accomplished only by expensive and complicated structure. In accordance with the present invention this separation is accomplished by a relatively simple arrangement of vertical baffles and chambers. This arrangement is illustrated in FIG. 4 wherein the outer tube 47 is shown opened and flattened. This separating arrangement comprises a series of vertically elongated chambers 49 and a series of vertical baffles 51. Assuming a counterclockwise rotary motion of the mixture entering the secondary discharge channel, each of the chambers 49 is formed of a front member 52, a perforated rear member 53 and a top member 54. Operation of this arrangement to separate the steam and water is as follows. As the mixture enters the secondary discharge channel, between the covers 41 and 48, with the assumed counterclockwise rotary motion, it encounters the front members 52 and the baffles 51 which arrest the rotary motion and turn the mixture downward as illustrated by the solid arrows. The resulting centrifugal force causes the steam to flow perpendicular to the flow of the water and generally toward the rear members 53, as shown by the dashed arrows, whereby the steam enters the chambers 49 through the perforations in the rear members 53 while the water flows downward. In the upper part of each chamber 49, a steam exit opening 56 is formed in the outer tube 47. Since the open lower portions of the chambers 49 are below the water level, the steam turns upward and passes through the exit openings 56 and thence upward between the separating units 21 into the steam chamber 16 (FIG. 1).

Meanwhile, the steam vortex which has entered the preliminary dryer inlet tube 37 proceeds upward therethrough at relatively high velocity into a preliminary dryer vortex tube 55. Because of the continued rotary motion, water carried by this steam is forced outward to form a layer against the inner wall of the tube 55. This water layer is captured and returned to the pool by a dryer pickoff ring 57, an annular cover 58 and a removable tube 59 while the steam continues upward through the pickoff ring 57 into the steam chamber 16 (FIG. 1).

The preliminary dryer removal tube 59 is extended upward beyond the top of the dryer pickoff ring 57 to prevent the exiting high-velocity stream of steam from contacting a steam-water mixture which forms over the water pool surface among the separating units 21 (FIG. 1) due to the steam rising from the surface of the water pool and due to the steam flow from the exit openings 56 in the outer tubes 47 of the separators 22. The water from the bottom of preliminary dryer removal tube 59 is discharged downward onto the top of the separator 22 and runs down the outside of the separator 22 where it encounters the steam flow from the exit openings 56. The velocity of this steam as it rises between the separators 22 is sufficient to entrain some of the water falling from the preliminary dryers 23. (Removal tube 59 may be supported by a plurality of struts 60.)

An important feature of the present invention is that the outside diameter of the preliminary dryer 23 is substantially less than the outside diameter of the separator 22. For example, the outside diameter of preliminary dryer 23 may be about one-half the outside diameter of separator 22. Thus as the steam from exit openings 56 flows upward from among the separators 22 into the region among the preliminary dryers 23 the greater volume due to the smaller diameter of the preliminary dryers results in a decrease in the velocity of the steam. This decreased velocity allows the entrained water to drop out of the steam as the steam rises into the steam chamber 16 (FIG. 1).

In an example implementation of the present invention the overall height of each separating unit 21 is about 96 inches, the height of the separator 22 is about 66 inches, the maximum outside diameter of the separator 22 is about 13 inches, the maximum outside diameter of the preliminary dryer 23 is about 7 inches, and the separating units 21 are spaced from one another by about 13.5 inches center to center.

The advantages of the separator-preliminary dryer unit of the present invention over the prior art arrangements may be summarized as follows. For a separator of similar size and a preliminary dryer of significantly reduced size, the steam flow capacity is increased at least 30 percent for the same maximum limits of water carryover and steam carryunder. The separating unit of the present invention maintains satisfactory operation over increases in inlet quality of at least 25 percent. The foregoing improvements in performance are achieved by a simplified, less costly structure which does not require complicated components such as intricate castings.

Thus what has been described is a gas-liquid separating unit of simplified construction which provides improved performance. While an illustrated embodiment of the invention has been described herein, adaptations thereof may be made by those skilled in the art without departure from the spirit and scope of the invention as defined by the following claims.

What is claimed is:

1. A gas-liquid separating system comprising, the combination of: an elongated separator vortex tube having a gas-liquid mixture inlet at one end and an outlet at the other end; means adjacent said inlet for receiving a gas-liquid mixture and for establishing in said separator vortex tube a gas vortex surrounded by a liquid vortex; an elongated dryer vortex tube having an inlet end and an outlet end; a dryer inlet tube adjacent the inlet end of said dryer vortex tube and extending a predetermined distance into the outlet end of said separator vortex tube; a separator removal means for receiving a gas-liquid mixture flowing between said dryer inlet tube and said separator vortex tube, said separator removal means including a separator removal tube disposed coaxially with and surrounding at least the outlet end of said separator vortex tube, said separator removal tube being formed with at least one gas escape port; dryer removal means adjacent the outlet end of said dryer vortex tube including a dryer removal tube, said dryer removal tube having an outside diameter substantially less than the outside diameter of said separator removal tube to reduce the velocity of the gas issuing from said gas escape port.

2. A gas-liquid separating system comprising: a first elongated vortex tube having an inlet end and an outlet end; a vortex generator for receiving a gas-liquid mixture and for establishing in said first vortex tube a gas vortex surrounded by a liquid vortex; first and second coaxially disposed pickoff rings extending into the outlet end of said first vortex tube and forming a first annular passage for receiving a substantial portion of said liquid vortex and a second annular passage for receiving a gas-liquid mixture from a boundary layer between said gas and liquid vortices; a second elongated vortex tube having an outlet end and having an inlet end disposed adjacent the outlet end of said first vortex tube to receive a substantial portion of said gas vortex; and a third pickoff ring extending into the outlet end of said second vortex tube forming a third annular passage for removing additional liquid from said gas.

3. The system defined by claim 2 wherein said second annular passage contains gas-liquid separating means.

4. A gas-liquid separator comprising an elongated vortex channel having a gas-liquid inlet at one end and an outlet at the other end; means adjacent said inlet for receiving a gas-liquid mixture and for causing rotary motion of said mixture to form a gas vortex surrounded by a liquid vortex in said vortex channel; a first discharge passage; means adjacent said outlet of said vortex channel for directing said liquid vortex into said first discharge passage; a second discharge passage; means adjacent said outlet of said vortex channel for directing a gas-liquid mixture from the boundary between said gas and liquid vortices into said second discharge passage; at least one gas-collecting chamber in said second discharge passage said chamber having spaced sides aligned generally perpendicular to the direction of said rotary motion, the one of said sides spaced from the other of said sides in the direction of said rotary motion being formed with openings to receive gas from said gas-liquid mixture in said second discharge passage; and means providing escape of received gas from said chambers.

5. The gas-liquid separator of claim 4 wherein the end of said gas-collecting chamber adjacent the outlet end of said separator is closed by a top member.

6. The gas-liquid separator of claim 4 including a plurality of gas-collecting chambers radially spaced in said second discharge passage.

7. The gas-liquid separator of claim 6 further including a longitudinally positioned substantially straight vane between each pair of said gas-collecting chambers.

8. The gas-liquid separator of claim 4 wherein said means providing escape of received gas from said chamber comprises at least one opening from said chamber through the wall of said second discharge channel to the exterior of said separator.

9. In a gas generating system, apparatus for separating a gas-liquid mixture comprising: a plurality of closely spaced-apart separator-preliminary dryer assemblies disposed to receive said gas-liquid mixture, each of said assemblies including a separator and a preliminary dryer disposed in series, said separator including means for transmitting a substantial portion of the gas of said mixture to said preliminary dryer and extraction means for returning a substantial portion of the liquid of said mixture to a pool and for issuing an additional portion of said gas from said extraction means to the exterior of said separator among said assemblies and into a gas-receiving chamber, said preliminary dryer including means for extracting additional liquid from said gas and for transmitting aid gas to said gas-receiving chamber, said preliminary dryer having an outside diameter substantially less than the outside diameter of said separator for decreasing the velocity of said gas issuing from said extraction means of said separator to decrease the amount of liquid carried by said last mentioned gas into said chamber.

10. A gas-liquid separator comprising an elongated vortex channel having a gas-liquid mixture inlet at one end and an outlet at the other end; means adjacent said inlet for receiving a gas-liquid mixture and for establishing in said vortex channel a gas vortex surrounded by a liquid vortex; a first discharge channel surrounding said vortex channel; means adjacent said outlet of said vortex channel for directing said liquid vortex into said first discharge channel; a second discharge channel surrounding said first discharge channel; means adjacent said outlet of said vortex channel for directing a gas-liquid mixture from the boundary between said gas and liquid vortices into said second discharge channel; a plurality of longitudinally positioned substantially straight members for arresting the vortex flow of said gas-liquid mixture in said second discharge channel; and means for allowing the escape of the gas of said gas-liquid mixture from said second discharge channel.